United States Patent [19]

Nelson

[11] Patent Number: 5,020,221

[45] Date of Patent: Jun. 4, 1991

[54] PIPE CHAMFER AND DEBURRING TOOL

[76] Inventor: Clifford P. Nelson, 139½ E. Division, Kewanee, Ill. 61443

[21] Appl. No.: 112,501

[22] Filed: Oct. 22, 1987

[51] Int. Cl.$^5$ .............................. B26B 3/00
[52] U.S. Cl. ...................... 30/169; 30/278; 82/128
[58] Field of Search ............ 30/278, 169, 280, 296.1, 30/282; 82/4 C, 128

[56] References Cited

U.S. PATENT DOCUMENTS

| | | | |
|---|---|---|---|
| 3,595,107 | 7/1971 | Dackow | 82/4 C |
| 3,661,472 | 5/1972 | Beauloye | 82/4 C |
| 3,869,794 | 3/1975 | Smith | 30/278 |

FOREIGN PATENT DOCUMENTS 2185928  8/1987  United Kingdom ............... 82/4 C

Primary Examiner—Timothy V. Eley
Assistant Examiner—William Fridie
Attorney, Agent, or Firm—Appleton, Mark A.

[57] ABSTRACT

A deburring and chamfering device for giving a desired profile to the end of a pipe, rod, or the like. The device comprising an outer shell with a cutting blade extending diametrically across an inner hole. The blade has a profile which is complementary to the desired profile. The desired profile is cut on the end of the pipe by rotating the device while it is in contact with the pipe.

11 Claims, 1 Drawing Sheet

PIPE CHAMFER AND DEBURRING TOOL

FIELD OF THE INVENTION

This invention relates in general to a means for chamfering and deburring plastic pipe. More specifically, this invention relates to a handheld tool comprising, in part, a hardened steel blade, that is capable of rotating around a pipe to remove any rough edges on the end of the pipe.

As used herein, the term "pipe" means substantially any elongated object with a circular cross section, regardless of whether it might be better described as a rod, hose, bolt, stud, or the like.

BACKGROUND OF THE INVENTION

Polyvinyl-chloride (PVC) pipe, once cut, often contains a ragged edge that requires beveling prior to its insertion into a pipe fitting. If so, it is desirable to bevel the cut end of the pipe to insure a secure joint in the pipe fitting subsequent to a cementation of a PVC pipe into an end fitting. A smooth surface on the cut end of the PVC pipe is preferred for proper joinder of PVC pipes and for preventing leakage of any liquids that pass through the pipes.

Very often, an accepted method of preparing and beveling the PVC pipe is to use sandpaper, a knife or file. However, these methods are at best clumsy and difficult to implement. Furthermore, these methods do not preclude the possibility of uneven beveling. The present invention provides a quick method of beveling PVC pipe that requires very little effort. The present invention insures a secure joint when the PVC pipe is placed and cemented into assorted plastic fittings. The invention may be used under ordinary water pressure systems.

The Smith U.S. Pat. No. 3,869,794 and Harbaugh U.S. Pat. No. 4,382,330 show hand operated cutting tools that rotate about a cylindrical object. Smith discloses a tool for shaping either end of a candle or an object made of similar material into a uniform, generally symmetrical shape. On one side of the upper conical portion of the Smith device is mounted a cutting blade which may be easily detachable by removal of a single screw or may be molded integrally with the top portion of the shell. Harbaugh shows a coin wrapper cutting tool for cutting the crumpled end portions of wrappers of packaged rolls of coins.

Thus, an object of the present invention is to provide economical, quick and easily used means for deburring and chamfering PVC pipe.

Another object of the invention is to provide means for evenly beveling PVC pipe.

A further object of the invention is to provide means for accurately deburring PVC pipe so as to insure a secure joint when the PVC pipe is placed and cemented in a plastic fitting.

Moreover, it is an object of the invention to provide means for accurately deburring PVC so as to insure a leak-free PVC pipe joint.

In keeping with an aspect of the invention, these and other objects are accomplished by a tool having a bore which fits over the end of a pipe. A cutting blade extends diagonally across the bore, the cutting blade having a profile which is complementary to the contour which is desired for the end of the pipe. The end of a pipe is fitted into the bore and against the cutting blade. Then, the device is rotated until the profile on the cutting blade shapes the end of the pipe into the desired contour.

BRIEF DESCRIPTION OF THE DRAWINGS

The inventive device will become apparent from the following description taken in conjunction with the attached drawing illustrating a preferred embodiment wherein.

DETAILED DESCRIPTION OF THE INVENTION

Figure 1:
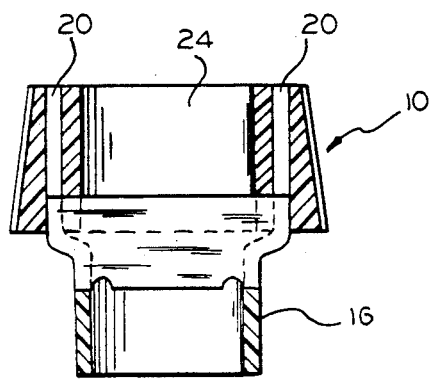
FIG. 1 is a vertical cross-sectional view of the inventive PVC deburring device.
Figure 2:
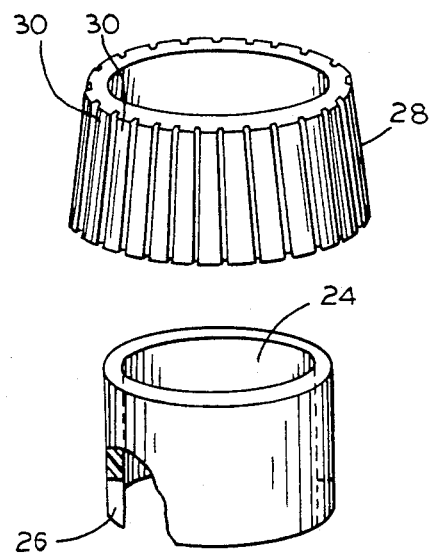
FIG. 2 is an exploded view in perspective of the PVC deburring device.
Figure 2:
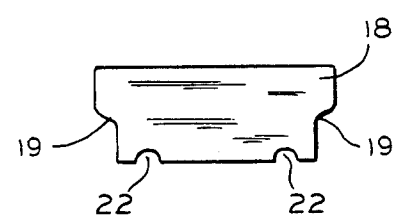

FIGS. 1 and 2 show the PVC pipe deburring device 10 as being a hollow, generally cylindrical shell 12 which includes a lower portion 16 with a diameter which is smaller than the diameter of the top portion 14. In one embodiment, the entire shell 12 was about ⅞" in length. In this embodiment, the upper portion 14 is separated from the lower portion 16 by a downwardly and inwardly tapering of substantially 0.155 inches, approximately one-half inch from the bottom of shell 12. The angle of tapering between the upper portion 14 and lower portion 16 may be anywhere from 30° to 90°. The upper portion 14 of shell 12 is ⅞" in length.

The shell 12 supports a cutting blade 18 that extends through the diameter of the upper portion 14. The support for the cutting blade 18 is formed by two diametrically opposed slits or slots 20 that extend along the entire length of the upper portion 14 and partially into the lower portion 16 of the shell 12. In the described embodiment, the slits or slots 20, which are positioned opposite each other, were about 15/16" in length and 1/32" in width.

The cutting blade 18, may be somewhat similar to a hack saw blade or any similar and suitable cutting edge. The blade 18 is held by the slots or slits 20, with the blade placed in and extending diametrically across the interior of shell 12, with the ends of the cutting blade 18 securely fitting in the slots or slits 20. The cutting blade 18 is tapered along the end portions 19 so as to conform to the tapering between the upper and lower portions, 14 and 16, of shell 12.

Furthermore, the cutting means 18 includes two symmetrical profile indentations 22, situated slightly away from the corners of the bottom edge (FIG. 2). The profile of these indentations 22 is complementary to the desired contour at the rim of the pipe after the deburring process. In the described embodiment, the distance between the two indentations 22, as measured from their centers, was approximately 9/16". The cutting means 18 has other approximate dimensions of 1.075" for the upper edge, 13/16" for the lower edge, 7/16" for height, and 1/32" for width. The height of the cutting blade 18 should not extend along the entire length of the slots or slits 20 because such an extension would preclude an easy securing of the cutting means 18 within shell 12. The indentations 22 are formed at an angle of approximately 20° relative to the plane of the blade 20 as to provide a cutting edge.

Another component of the invention is an inner cylindrical tube portion 24 that fits snugly inside the shell 12.

The bottom of the inner cylindrical portion 24 also contains diametrically opposed slits or slots 26 that fit securely over the top portion of the cutting blade 18 and cause it to be locked in place within the shell 12. In the described embodiment, the approximate dimensions of the inner cylindrical portion 24 are: 21/32" height, 9/16" diameter, and 0.07" thickness. The slits or slots 26 that are located along the bottom portion of the inner cylindrical portion 24 have the approximate dimensions of 3/16" in length and 1/32" in width.

The exterior of shell 12 includes a somewhat conical hand grip 28 that completely surrounds the top portion 14 of shell 12. The grip 28 includes a plurality of raised, evenly spaced ridges 30 which are parallel to each other and generally extend in alignment with the axis of shell 12. The grip 28 may be made of any semi-rigid to rigid substance such as rubber, plastic, and the like. The grip 28 enables the user of the device to maintain a firm hold on the device when it is in use. The approximate dimensions of the grip are: 1.080" diameter; 0.295" thickness; and ⅞" length.

In FIG. 2, four components comprise the present device 10. These components include the shell 12, cutting blade 18, inner cylindrical portion 24, and cylindrical hand grip 28. The shell 12, portion 24, and grip 28 telescope together where they are cemented in place. After each of these components is cemented in place the device 10 is finished.

Figure 3:
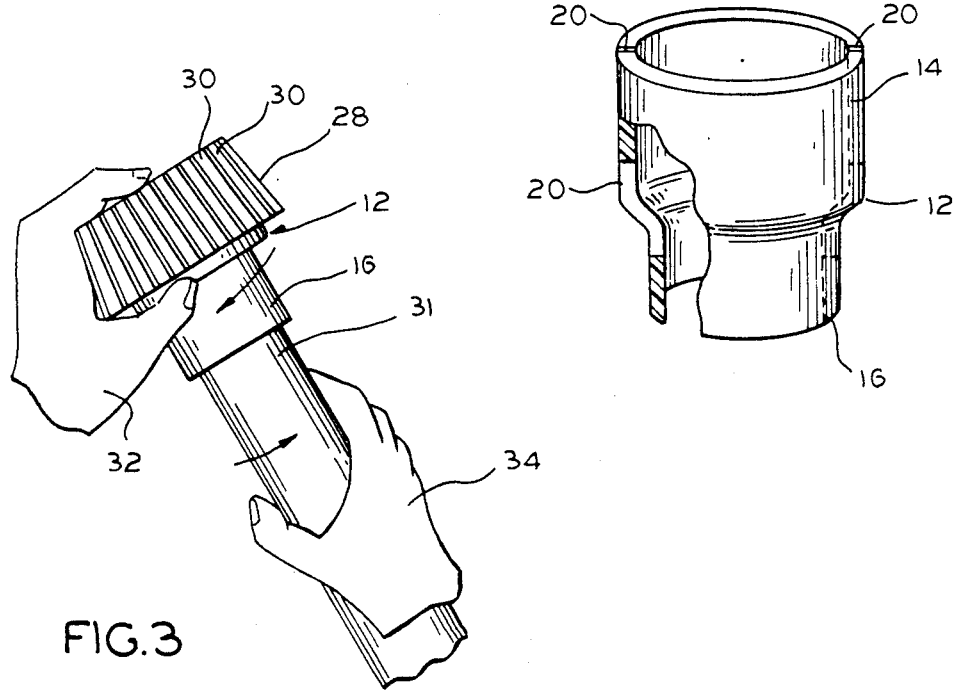
FIG. 3 is a perspective view of the PVC deburring device shown in FIGS. 1 and 2, being used to bevel the PVC pipe.

As depicted in FIG. 3, in operation a pipe 31 is inserted into the bottom of the device 10 and through the bore at the center of the lower portion 16 of the shell 12. The rim at the end of the pipe 31 that is inside the device 10 makes contact with the symmetrical indentations 22 that are located near the ends of the cutting means 18. The inventive device 10 is held in one hand 32 by the grip 28, while the other hand 34 holds the pipe 31. While maintaining a firm grasp of the grip 28, the grip 28 is rotated counterclockwise, while the other hand either holds or counter rotates the pipe 31, simultaneously applying a slight pressure of the device 10 on the pipe. The rotation of the device relative to the pipe continues until the pipe has a clean, smoothly chamfered edge on its rim.

The materials from which the device 10 is constructed should include a strong, lightweight material, such as plastic, for the shell 12 and inner cylindrical portion 24. The cutting means 18 may be made of steel or other suitable material which may be honed to a sharp cutting edge. The grip 28 may be made of a plastic or rubber material.

Moreover, while the device 10 has been described in terms of approximate measurements of the various components, it should be understood that the size of the device 10 and its respective components may vary according to the size of the pipe to be deburred and chamfered. Since PVC pipe, or the like, comes in a plurality of sizes, there may be a plurality of sizes of the present device 10.

Therefore, it should be recognized that, while the invention has been described in relation to a preferred embodiment thereof, those skilled in the art, may develop a wide variation of structural details without departing from the principles of the invention. Therefore, the appended claims are to be construed to cover all equivalents falling within the true scope and spirit of the invention.

The invention claimed is:

1. A deburring and chambering device for pipes, said device comprising an outer shell, a cutting means, a slotted inner tube fitting and a grip; said outer shell and said inner tube fitting over an locking said cutting means against axial movement as said cutting means fits into said slots, with said cutting means shaped to seat itself on the wall of the pipe for dramatically shaping an end of a pipe when turned in a counter-clockwise manner, and said grip surrounding and attached to said outer shell.

2. The deburring and chamfering device of claim 1 wherein said outer shell comprises an upper portion and a tapered lower portion.

3. The deburring and chamfering device of claim 1 wherein said cutting means is a blade, said outer shell comprises diametrically opposed slots extending along said upper portion and partially into said lower portion for receiving and supporting the blade.

4. The deburring and chamfering device of claim 3 wherein said slots of said outer shell securely hold the ends of said cutting blade.

5. The deburring and chamfering device of claim 3 wherein said inner tube is positioned within and bonded to said outer shell.

6. The deburring and chamfering device of claim 1 wherein said cutting means is a blade which extends diametrically across said inner region and said outer shell.

7. The deburring and chamfering device of claim 1 wherein said cutting means is a blade which includes symmetrical indentation profiles on the lower portion of said blade and opposite said end of said pipe where shaping occurs.

8. The deburring and chamfering device of claim 7 wherein said grip surrounds the upper portion of said outer shell.

9. The deburring and chamfering device of claim 8 wherein said grip comprises spaced ridges which are substantially parallel to an axis of said outer shell.

10. The deburring and chamfering device of claim 9 wherein said outer shell, said inner tube, said cutting means, and said grip are cemented together to form the final assembly into an integral unit.

11. A deburring and chamfering device for plastic pipes, said device comprising a hollow outer cylindrical shell having sections with larger and smaller diameters, respectively, a cutting blade extending diametrically across said outer shell, an inner cylindrical member fitting inside the section of the shell which has said larger diameter, said inner member fitting over and locking said cutting blade against axial movement, and a grip surrounding said outer shell, wherein a pipe may be moved upwardly within said hollow shell to come into contact with said cutting blade, said cutting blade having a profile which corresponds to a desired chamfer for the end of said pipe, whereby said device and said pipe may be rotated in a circular fashion relative to each other while cutting blade is in contact with said pipe to provide a uniform chamfer and a deburring of said pipe.

* * * * *